United States Patent
de Beus

(10) Patent No.: US 11,442,430 B2
(45) Date of Patent: Sep. 13, 2022

(54) RAPID PACKAGING PROTOTYPING USING MACHINE LEARNING

(71) Applicant: KYOCERA Document Solutions, Inc., Osaka (JP)

(72) Inventor: Eric de Beus, Redondo Beach, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 579 days.

(21) Appl. No.: 16/552,946

(22) Filed: Aug. 27, 2019

(65) Prior Publication Data
US 2021/0064001 A1 Mar. 4, 2021

(51) Int. Cl.
*G05B 19/4099* (2006.01)
*G06N 3/08* (2006.01)

(52) U.S. Cl.
CPC ........... *G05B 19/4099* (2013.01); *G06N 3/08* (2013.01); *G05B 2219/49017* (2013.01); *G05B 2219/49023* (2013.01)

(58) Field of Classification Search
CPC .................. G06N 3/08; G05B 19/4099; G05B 2219/49017; G05B 2219/49023
See application file for complete search history.

(56) References Cited

U.S. PATENT DOCUMENTS

| 5,659,478 A | * 8/1997 | Pennisi .............. G05B 19/4099 700/98 |
| 6,358,191 B1 | 3/2002 | Greever |
| 8,757,479 B2 | 6/2014 | Clark et al. |
| 10,002,207 B2 | 6/2018 | Pettersson |

* cited by examiner

*Primary Examiner* — Laura A Gudorf
(74) *Attorney, Agent, or Firm* — Rowan TELS LLC

(57) ABSTRACT

A system includes a scanner to convert a packaging sketch into a pixelated image and a convolutional neural network configured to segment the pixelated image into bounded objects including fold lines and cut lines. A controller is configured to transform the fold lines and the cut lines into control commands to a folding machine and a cutting machine. A method includes converting a packaging sketch into a pixelated image using a scanner and segmenting, using a convolutional neural network, the pixelated image into bounded objects including fold lines and cut lines. The method also includes transforming, using a controller, the fold lines and the cut lines into control commands to a folding machine and a cutting machine.

20 Claims, 11 Drawing Sheets

RAPID PACKAGING PROTOTYPING USING MACHINE LEARNING

BACKGROUND

Packaging is typically formed from sheets of card stock, card board, or other material, (collectively known as packaging stock), and its structural design is typically done using CAD software which enables the user to draw lines and shapes and specify which lines are intended to be cut, which folded, etc. Although the CAD software is sometimes specialized for the design of packaging, it can still be time-consuming to design even a simple box, so there is a need for improved systems and methods for rapid packaging design.

BRIEF SUMMARY

A system for rapid packaging and prototyping that utilizes machine learning includes a scanner, a convolutional neural network, and a controller. The scanner converts a packaging sketch into a pixelated image. The convolutional neural network is configured to segment the pixelated image into bounded objects including fold lines and cut lines. The controller is configured to transform the fold lines and the cut lines into control commands to a folding machine and a cutting machine.

A method for rapid packaging and prototyping that utilizes machine learning includes converting a packaging sketch into a pixelated image using a scanner. A convolutional neural network segments the pixelated image into bounded objects including fold lines and cut lines. A controller transforms the fold lines and the cut lines into control commands to a folding machine and a cutting machine.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
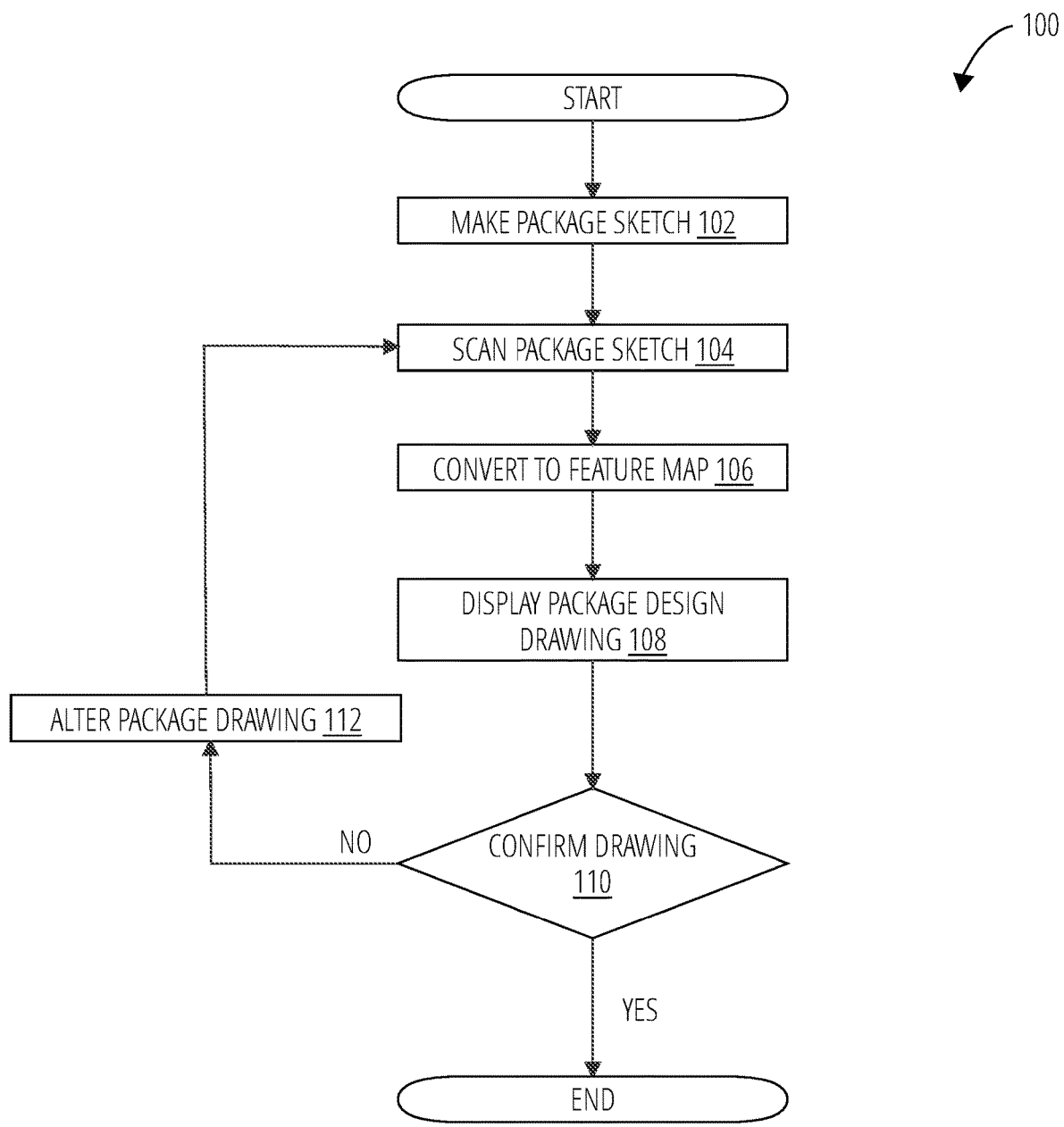
FIG. 1 illustrates a method 100 in accordance with one embodiment.

"Bounded objects" refers to a portion of an image that contains all of the important features of a particular object, such as the edges or boundaries of the object. Examples of bounded objects may include rectangular, trapezoidal, and triangular objects, but are not limited thereto.

"Control commands" refers to commands used to control a folding machine or a cutting machine while the machine is performing its folding or cutting process.

"Controller" refers to Logic configured to transform fold lines and cut lines into control commands to a folding machine and a cutting machine.

"Convolutional neural network" refers to a neural network including an input and an output layer, as well as multiple hidden layers. The hidden layers include a series of convolutional layers that convolve with a multiplication or other dot product.

"Cut lines" refers to lines on package stock that should be cut. These lines may be identified on a package design drawing or sketch.

"Cutting machine" refers to a machine configured to cut packaging stock based on received control commands.

"Feedback path" refers to a route or step in a process in which an item or downstream product is sent from a downstream step to an upstream step, thereby allowing another pass through the process. As an example, a printed package design drawing may be annotated by a user using hand drawn annotations, before the drawing is scanned and fed back into a machine learning system.

"Fold lines" refers to lines one package stock should be folded. These lines may be identified on a package design drawing or sketch.

"Folding machine" refers to a machine configured to fold packaging stock based on received control commands.

"Non-similar bounded objects" refers to bounded objects with dissimilar shapes and typically a different number of vertices.

"Package design instructions" refers to instructions received by a controller detailing how a package is to be constructed. The instructions may include bounded objects including fold lines and cut lines.

"Packaging sketch" refers to a sketch showing lines and shapes for packaging formed from card stock, cardboard, etc. The lines may be indicated as, for example, cut lines, fold lines, perforation lines.

"Pixelated image" refers to the result of displaying a bitmap or a section of a bitmap at such a large size that individual pixels, small single-colored square display elements that comprise the bitmap, are visible.

"Scanner" refers to an input device for capturing images from photographs or pages of text.

"Similar bounded objects" refers to bounded objects with similar shapes and the same number of vertices.

A system and method for rapid packaging prototyping utilizing machine learning is a system and method for rapidly prototyping a packaging design by making a hand-drawn sketch obeying certain conventions, scanning the sketch, and converting the scanned sketch, using machine learning, into a prototype package design. FIG. 1 depicts an exemplary flow chart for the steps in this process.

The system and method for rapid packaging prototyping utilizing machine learning may include a scanner, a convolutional neural network, and a controller. The scanner may be utilized to convert a packaging sketch into a pixelated image. The convolutional neural network may be configured to segment the pixelated image into bounded objects including fold lines and cut lines. The controller may be configured to transform the fold lines and the cut lines into control commands to a folding machine and a cutting machine.

In some configurations, the system and method may include logic to apply annotations enclosed with the bounded objects to transform non-similar bounded objects into similar bounded objects.

In some configurations, the system and method may include logic to alter the fold lines and the cut lines to transform the non-similar bounded objects into similar bounded objects. In this configuration, the fold lines may be depicted by solid lines between the bounded objects on the packaging sketch.

In some configurations of the system and method, at least some of the cut lines may be perforation lines depicted by irregular lines on the packaging sketch.

In some configurations of the system and method, the cut lines may be computed from a machine-derived rectangular bounding box for the packaging sketch.

In some configurations, the system and method may include a feedback path from a printer to the scanner.

FIG. 1 illustrates a method 100 for operating a system for rapid packaging prototyping utilizing machine learning. The method 100 may begin with the creation of a packaging sketch in block 102. The packaging design may be sketched on paper. In block 104 the packaging sketch is scanned using a scanner and a pixelated image is provided to a machine learning system. In block 106, the machine learning system generates a feature map from the pixelated image of the packaging sketch that are used to create package design instructions. The pixelated image is processed by a convolutional neural network that is trained to map input images into predicted per-pixel object maps, in order to perform image segmentation, which results, for each image, in a map that classifies and locates objects in the image (lines and their types, icons and alphanumeric symbols). In block 108, the package design instructions are utilized to render a package design drawing in a pre-press operator machine interface for confirmation by the user. In decision block 110, the user confirms if the package design drawing is correct or needs additional modifications. If the package design drawing is correct, the package design instructions are sent to the controller to begin printing the prototype ending the method 100. If the package design drawing is not correct, the method 100 moves to block 112 where the user alters the package design drawing or the packaging sketch and scans the altered package design drawing through the scanner returning to block 104.

Figure 2:
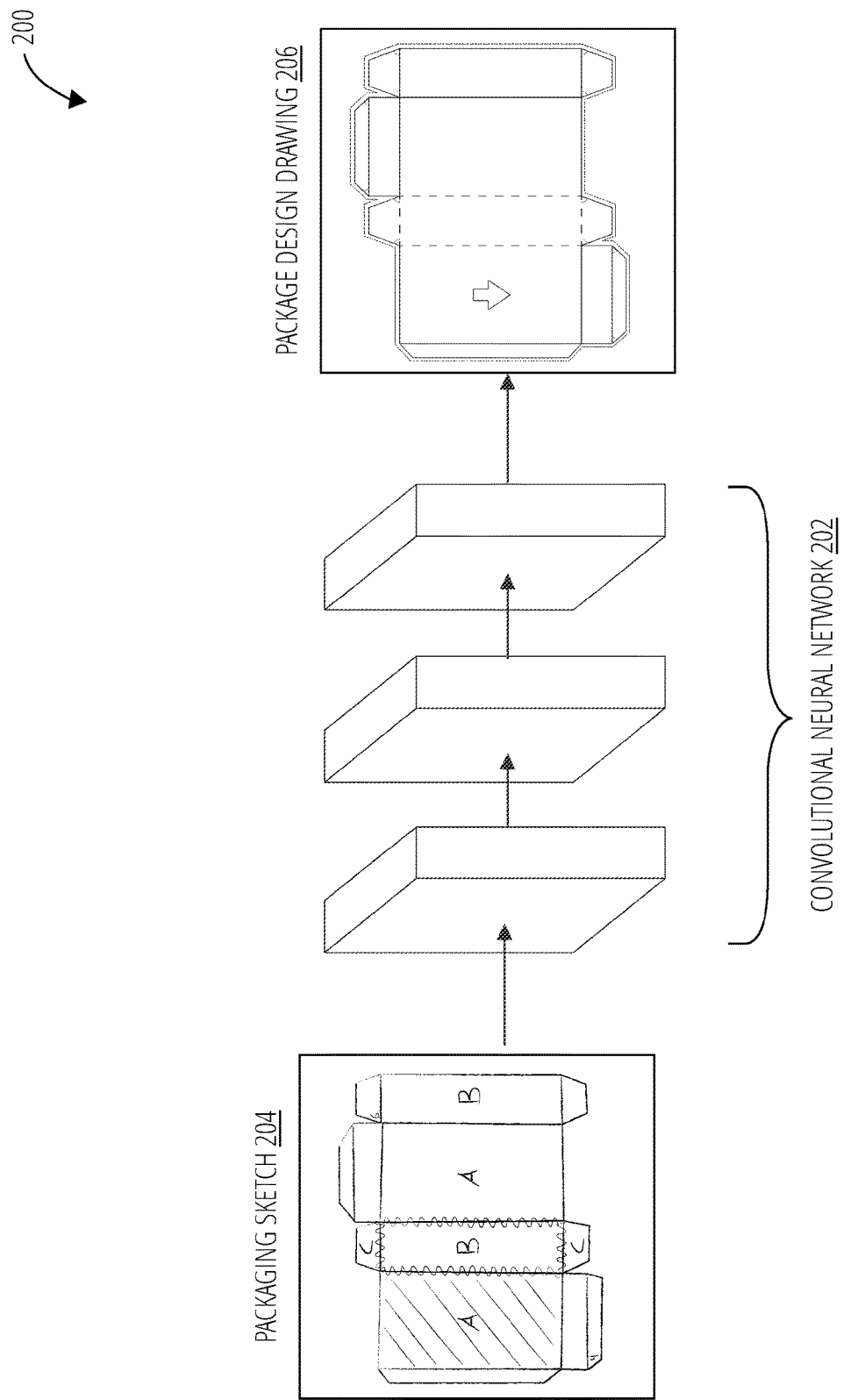
FIG. 2 illustrates a machine learning system 200 in accordance with one embodiment.

FIG. 2 depicts the several layers of a trained convolutional neural network 202 of a machine learning system 200 as they convert a rough hand-drawn input image of the packaging sketch 204 into a feature map for a package design drawing 206.

A neural network is a machine learning model that can be trained to recognize features in an image in a manner analogous to animal vision. The network consists of multiple layers of artificial, i.e., computer-simulated, "neurons", connected to each other by numerically valued artificial "synapses." The model is trained by being given training data, a series of images whose desired output is known, and having the numerical values of its "synapses" continually adjusted, by comparing the output to the desired output, until it can identify the desired image features with some acceptable probability of success. In effect, the training produces a model that approximates an unknown and non-linear image transformation function. A convolutional neural network is so called because each layer carries out a convolution operation, which enables it to identify image features independent of their position in the larger image.

In some configurations, the convolutional neural network 202 may utilize two (2) 256×256 convolutional layers, followed by one 128×128 max pooling layer, followed by two (2) 128×128 convolutional layers, followed by one (1) 64×64 max pooling layer, followed by three (3) 64×64 convolutional layers, followed by one (1) 32×32 max pooling layer, followed by three (3) 32×32 convolutional layers, followed by one (1) 16×16 max pooling layer, followed by three (3) 16×16 convolutional layers, followed by one (1) 8×8 max pooling layer, followed by one (1) 16×16 convolutional layer, followed by one (1) 16×16 unpooling layer, followed by three (3) 16×16 deconvolution layers, followed by one (1) 32×32 unpooling layer, followed by three (3) 32×32 deconvolution layers, followed by one (1) 64×64 unpooling layer, followed by three (3) 64×64 deconvolution layers, followed by one 128×128 unpooling layer, followed by two (2) 128×128 deconvolution layers, followed by one 256×256 unpooling layer, followed by two (2) 256×256 deconvolution layers, with each convolutional or deconvolution layer above immediately followed by a ReLU (rectified linear unit) nonlinearity layer.

Figure 3:
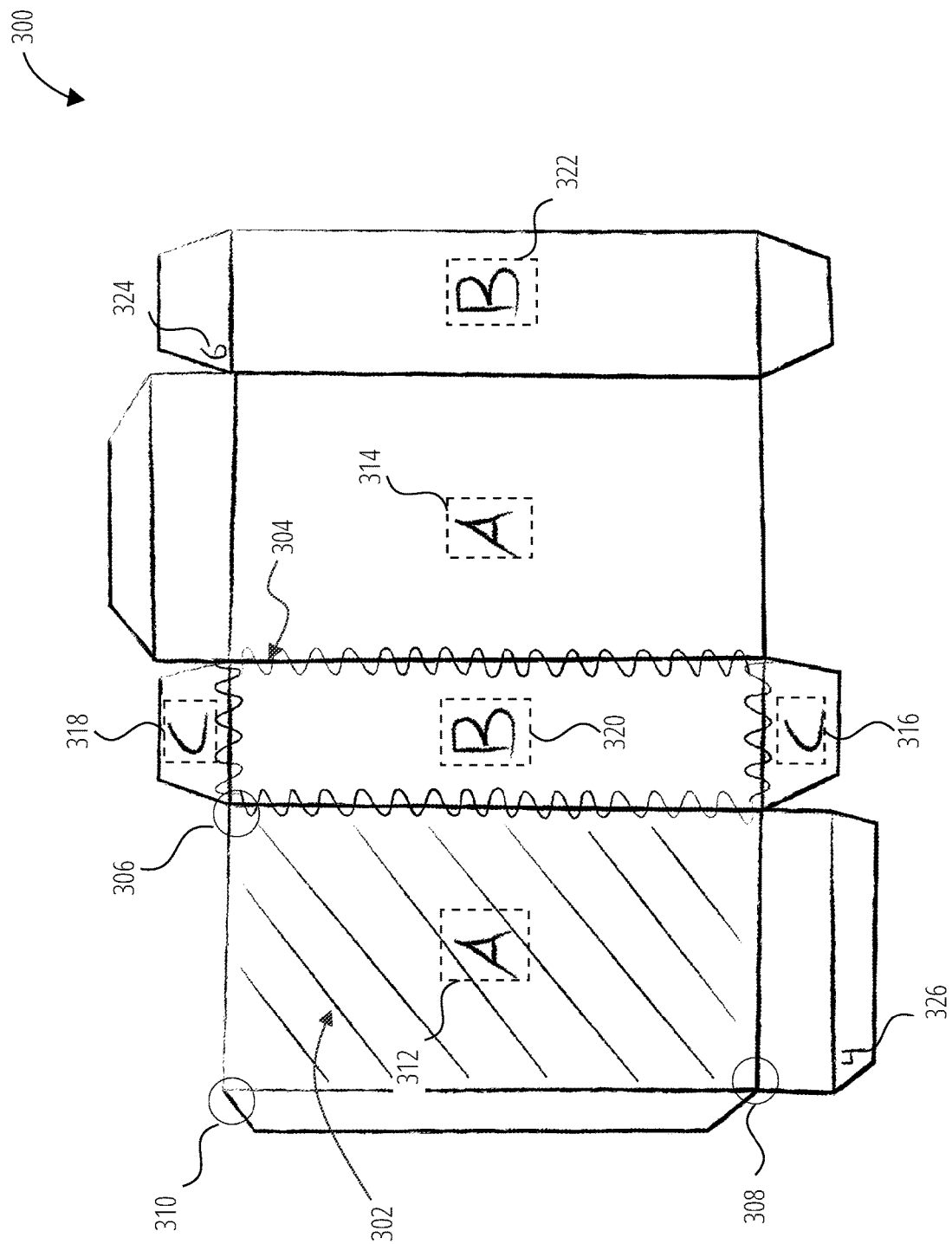
FIG. 3 illustrates a packaging sketch 300 in accordance with one embodiment.

An illustrative sample hand sketch for a box design is depicted in FIG. 3, which shows some sample drawing conventions used for the initial package sketch.

After being processed by the convolutional neural network, the sketch is converted into a feature map that indicates the type and location of the objects in the sketch. To convert the packaging sketch 300 into a feature map, the lines of the packaging sketch 300 may be straightened based on their end points. For example, the lines between end point 310 and end point 306, as well as the line between end point 310 and end point 308 may be straightened. In other instances, the lines may be converted to circular arcs, if recognized as curves. The diagonal lines that form the trapezoids may also be snapped to the nearest multiple of some number of degrees configurable by the user. These diagonal lines may be configured with a certain angle if the correct annotation is found. For example, annotation 326 represents the numerical value of 4 which may correspond to an angle of 40 degrees. Similarly, annotation 324 represents the numerical value of 6 which may correspond to an angle of 60 degrees.

The process of converting the sketch into a feature map may be accomplished by several object detection and classification algorithms that are described in FIG. 7-FIG. 10. These algorithms and methods may be utilized individually or combination to generate the feature map.

Conversion of the packaging sketch 300 into a feature map may also entail the adjustment of the certain detected shapes into a standard form such as rectangular, trapezoidal, or triangular shapes.

Furthermore, the conversion process may adjust the detected shapes based on matching symbols or annotations. Shapes that contain matching symbols may be adjusted to be the same size, by averaging their vertices and edge length. For example, the bounded objects with the annotation 312 and annotation 314 are marked with the letter A. These bounded objects would be adjusted to be rectangles of equal size. Similarly, the bounded objects marked with the letter B (annotation 320 and annotation 322) as well as the bounded objects marked with the letter C (annotation 318 and annotation 316) may be adjusted accordingly. These adjustments may define the features of the drawings with implied geometries between neighboring marked regions of similar or dissimilar markings. The marking of matching areas with letters is an example of a drawing convention.

The conversion process may also apply line types. For example, the lines surrounding the region marked with the letter B (annotation 320) has a zigzag line pattern 304 scribbled over them. This line pattern 304 may be considered dashed lines, to be folded. The use of zigzag lines to indicate a fold is another example of a drawing convention.

The conversion process may also apply hatching patterns. For example, the left-hatching (hatch lines 302) in the region marked with the letter A (annotation 312) might be considered to be an area to be folded down, while a right-hatched region might be folded up. A cross-hatched region may also indicate waste to be cut out.

Additionally, the conversion may indicate cut lines by positioning a machine-derived rectangular bounding box around the packaging sketch 300 and calculating the cut lines based on the region formed between the packaging sketch 300 and the machine-derived rectangular bounding box.

Figure 4:
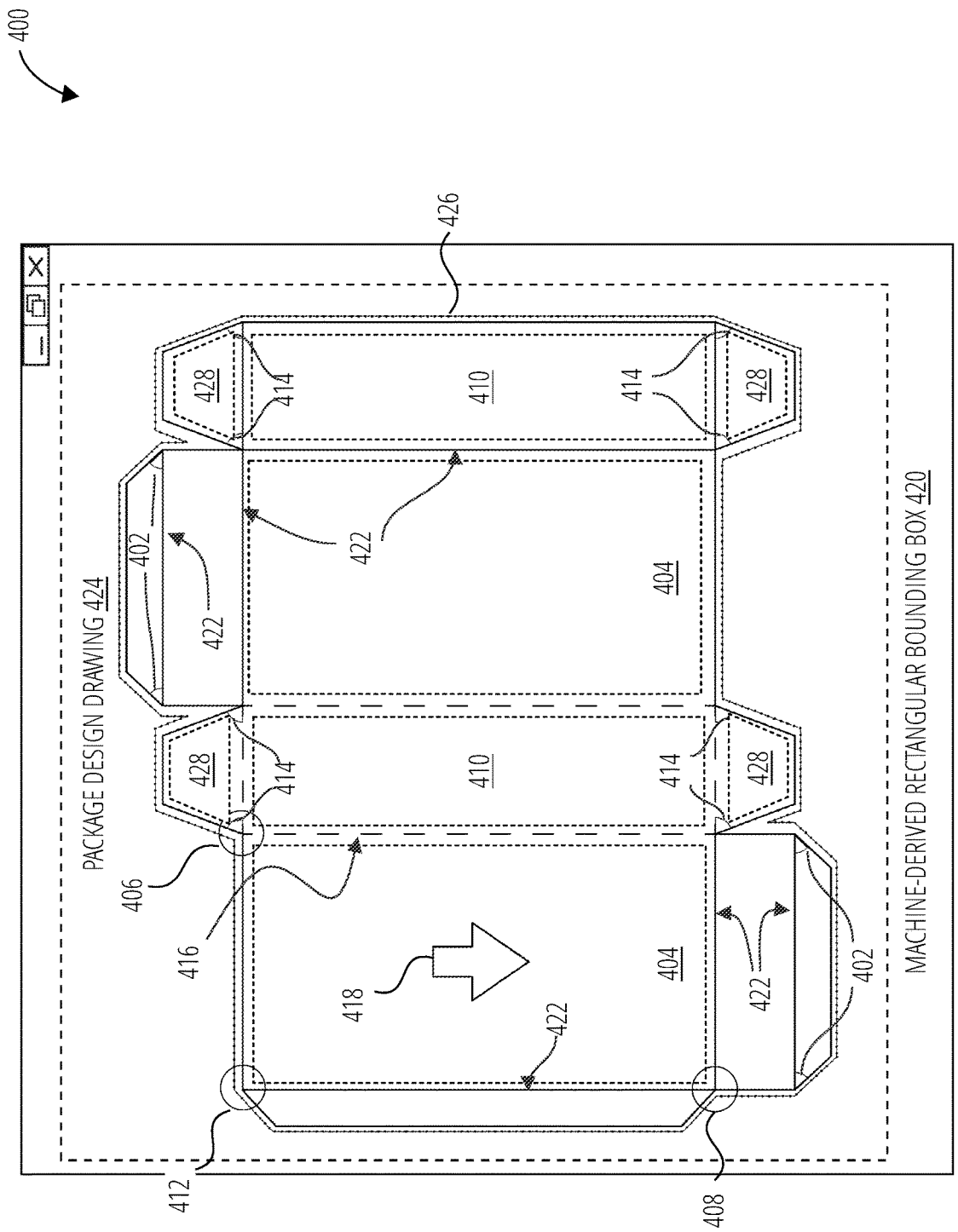
FIG. 4 illustrates a pre-press operator machine interface 400 in accordance with one embodiment.

FIG. 4 illustrates a fully converted feature map rendered as a displayable package design drawing 424 through a pre-press operator machine interface 400 for approval. If the design is rejected, the user can either redraw it, or alter the original drawing, and repeat the process from the second step, i.e., the scanning step.

The converted feature map may be configured as package design instruction for printing and rendering the predicted package design, similar to CAD file formats. The package design drawing 424 was generated from the conversion of the packaging sketch 300. During the conversion the line between the end point 412 and the end point 406 was straightened, as well as the line between the end point 412 and the end point 408. The regions marked with the letter A in the packaging sketch 300 have been made into similar bounded objects 404 and share the same shape and dimensions. The regions marked with the letter B in the packaging sketch 300 have also been made into similar bounded objects 410 and share the same shape and dimensions. The regions marked with the letter C in the packaging sketch 300 have also been made into similar bounded objects 428 and share the same shape and dimensions. The angle annotations for annotation 324 and annotation 326 have also been converted and the angles have been applied to the corresponding bounded objects in accordance with their geometry and constraints. For instance, the annotation 324 for an angle of 60 degrees may be applied to the similar bounded objects 428 as defined angles 414 that are implied by the regions marked with the letter C. Additionally, annotation 326 for the angle of 40 degrees may be applied to the similar bounded objects 404 as defined angles 402 associated with the region marked with the letter A.

The hatch lines 302 in the region with the letter A in the packaging sketch 300 may be converted to show a fold direction indicator 418 representing that the section folds down.

The line pattern 304 in the packaging sketch 300 is converted into a dashed line in the package design drawing 424 indicating perforation lines 416. Furthermore, the solid lines between the bounded objects may be represented as fold lines 422 in accordance with certain conventions.

The pre-press operator machine interface 400 displays a package design drawing 424 surrounded by a machine-derived rectangular bounding box 420. The machine-derived rectangular bounding box 420 is utilized in the calculations of the cut lines 426 that surround the package design drawing 424. The machine-derived rectangular bounding box 420 may be displayed through the pre-press operator machine interface 400.

In an embodiment, the internal representation of the design may be written out in a standard CAD format, such as DXF, CFF2, DDES, etc., for importation into a CAD program. Alternatively, it may be displayed or printed directly, using dieline conventions such as solid lines indicating cuts and dashed lines indicating folds, or blue lines indicating cuts and red lines indicating folds, etc.

Figure 5:
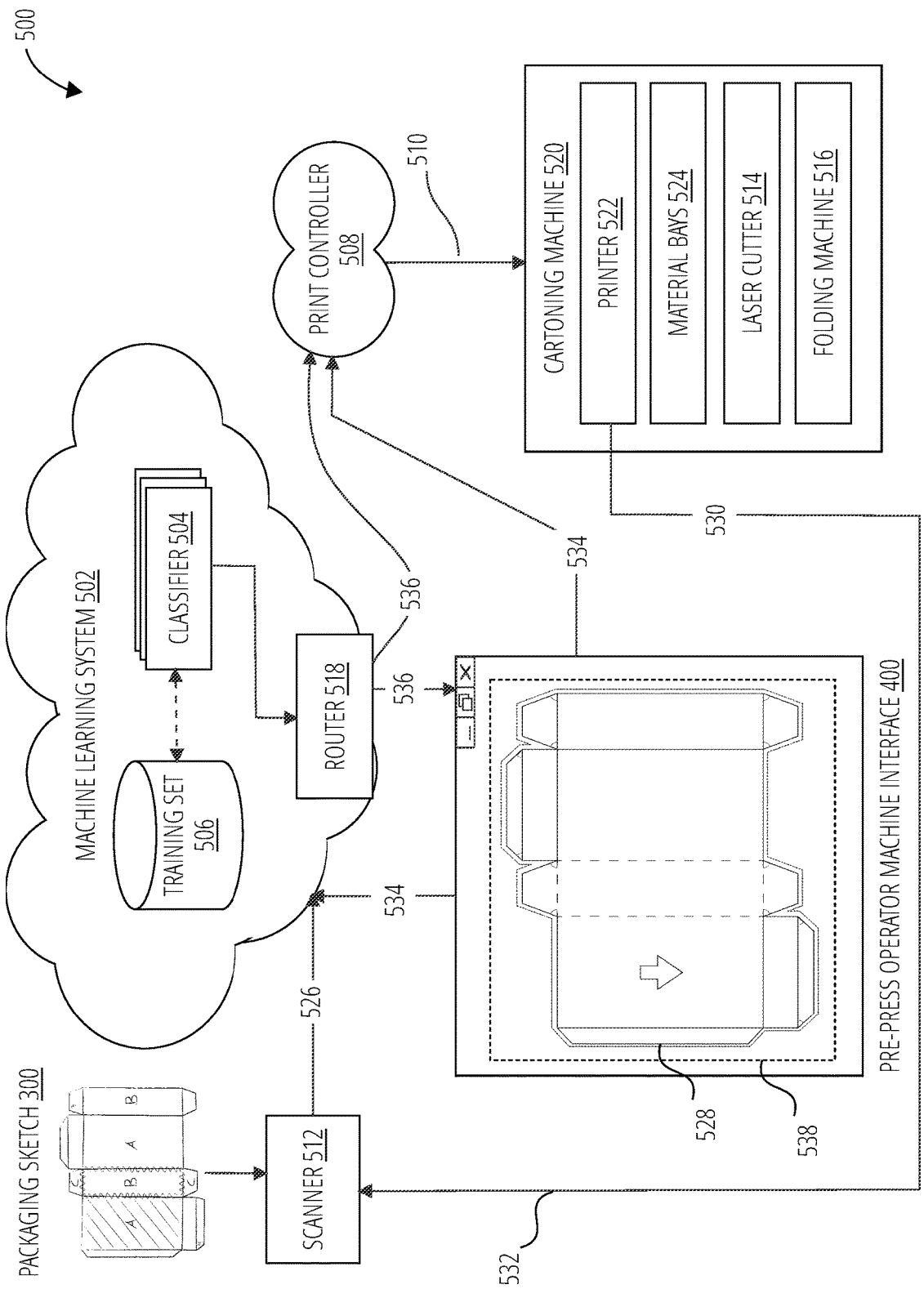
FIG. 5 illustrates a printing system 500 in accordance with one embodiment.

FIG. 5 depicts the components of a packaging design system at a high level.

In FIG. 5, a printing system 500 in accordance with one embodiment. The printing system 500 includes a cartoning machine 520 and a machine learning system 502, The cartoning machine 520 comprises one or more material bays 524, a printer 522, a laser cutter 514, and a folding machine 516. The machine learning system 502 comprises a classifier 504 and training set 506. The machine learning system 502 is responsive to a pixelated image 526 of a packaging sketch 300 from a scanner 512. The machine learning system 502 may generate package design instructions 536 from the pixelated image 526, which may be provided to a pre-press operator machine interface 400 (also referred to herein as an operator console) through a router 518 to render a package design drawing 528 allowing the operator to review and confirm on the package design instructions 536 through an operator response 534. Confirmed (or automated) package design instructions 536 may be sent to a controller 508, through the package design instructions 536, which applies control commands 510 for the package design instructions 536 to the cartoning machine 520. Other elements of the printing system 500 known in the art are omitted to simplify this description.

The cartoning machine 520, the machine learning system 502, the controller 508 and the pre-press operator machine interface 400 typically communicate over a network (not shown). The scanner 512 is provided with a packaging sketch 300 with hand drawn bounded objects and annotations. In some configurations, packaging sketch 300 may be a printed package design drawing 530 with hand drawn annotations that is provided to the scanner 512. The packaging sketch 300 may typically be assembled from one or more distinct electronic documents.

The machine learning system 502 is utilized to predict package design instructions 536 and, in some cases, to automatically select an initial set of package design instructions 536 to apply for creating a package from the packaging sketch 300. In some embodiments, the machine learning system 502 is trained, at least initially, by a training set of data (training set 506). The training set of data may comprise pairs of values. Each pair of values includes an input value and an output value. The output value is a desired value corresponding to the input value. In some embodiments, the printing system 500 uses a bias-variance tradeoff algorithm or a noise in the output values algorithm to train the machine learning system 502. In some embodiments, the printing system 500 uses a function complexity and an amount of training data algorithm or dimensionality of the input values algorithm to train the machine learning system 502. In some embodiments, the printing system 500 uses a support vector machines algorithm or a linear regression algorithm to train the machine learning system 502. These techniques may be applied by the machine learning system 502 individually, in various combinations, or in combination with training of an artificial neural network, as described in more detail below.

The machine learning system 502 applies the training set of data to build the classifier 504. The classifier 504 is trained to map input images into predicted per-pixel object maps, in order to perform image segmentation, which results, for each image, in a map that classifies and locates objects in the image (lines and their types, icons and alphanumeric symbols).

The machine learning system 502 applies the classifier 504 to generate a feature map for the packaging sketch 300 based on bounded objects and annotations identified in the pixelated image 526 of the packaging sketch 300. The feature map may indicate the type and location of the objects in the sketch.

Based on the predictions in the feature map, lines in the packaging sketch 300 may be straightened, based on their end points, or converted to circular arcs, if recognized as curves. Diagonal lines may be snapped to the nearest multiple of some number of degrees that may be a constraint set by the geometry of the drawing of a value configurable by the user.

The feature map may also allow for the adjustment of detected shapes into standard forms such as rectangular, trapezoidal, and triangular, shapes.

The feature map may also identify cut lines from the packaging sketch 300 by establishing a machine-derived rectangular bounding box surrounding the package design. Lines that are not between bounded objects may be classified as cut lines. The region formed between the package design and the machine-derived rectangular bounding box may be classified as a waste region. When the package design instructions 536 generate the package design drawing 528 in the pre-press operator machine interface 400, the machine-derived rectangular bounding box 538 may be shown to the user.

The feature map may also indicate modifications based on detected annotations in the packaging sketch 300. For instance, shapes that contain matching symbols may be adjusted to be the same size, by averaging their vertices and edge length. For example, the bounded objects with annotation 312 and annotation 314 would be adjusted to be rectangles of equal size. The marking of matching areas with letters is an example of a drawing convention.

The feature map may also indicate line types to be applied. For example, the lines surrounding the bounded object with annotation 320 has a zigzag line pattern 304 scribbled over them, would be considered dashed lines, which may indicate a fold line. In other instances, line pattern 304 may indicate that the lines are perforation lines.

The feature map may also indicate the package features from hatching patterns in the packaging sketch 300. For example, a left-hatching in bounded object with annotation 312 may be considered to be an area to be folded down, while a right-hatched region might be folded up. Additionally, a cross-hatched region may indicate waste regions to be cut out.

In some embodiments, a user operating the pre-press operator machine interface 400 may indicate whether the package design drawing 528 is correct through an operator response 534. The operator response 534 may be communicated to the controller 508 as an indication to proceed with the package design instructions 536 and convert the package design instructions 536 into control commands 510 for the cartoning machine 520. If the operator response 534 indicates that changes are needed, the operator response 534 may be communicated to the controller 508 that communicates control commands 510 to the cartoning machine 520 to generate a printed package design drawing 530 through the printer 522. The user may then make hand drawn annotations to the printed package design drawing 530 before it is scanned and fed back to the machine learning system 502, thereby forming an alternate feedback path 532.

Confirmations or changes are fed back to the machine learning system 502 to enhance the classifier 504. The classifier 504 may then be used to generate improved predictions and correlations in the future. For example, the machine learning system 502 may learn to identify waste regions in package design by the position of detected fold, cut, and perforation lines.

As the machine learning system 502 receives more packaging sketches and generates new feature map predictions, the machine learning system 502 applies them to future predictions utilizing a training set 506 to iteratively adjust the classifier 504. In some embodiments, once an accuracy of a certain prediction reaches a pre-defined threshold, the printing system 500 adds the prediction to automatic actions that are automatically applied to the controller 508 and not subject to confirmation via the pre-press operator machine interface 400.

The machine learning system 502 outputs predicted package design instructions 536 to a pre-press operator machine interface 400 as package design drawing 528

Once confirmed or modified by the user, the package design instructions 536 are applied to the controller 508. The controller 508 applies the package design instructions 536 for material from the material bays 524 to laser cutter 514 and then to the folding machine 516 to generate the designed package.

In some configurations, logic is used to apply annotations associated with the bounded objects to transform non-similar bounded objects into similar bounded objects. Operation of this logic may operate as follows:

If two bounding objects, or shapes, are identified by annotations as being matched, then identify the vertices of the two shapes. If they are not equal in number, the shapes cannot be matched, and the annotations are ignored.

Figure 6:
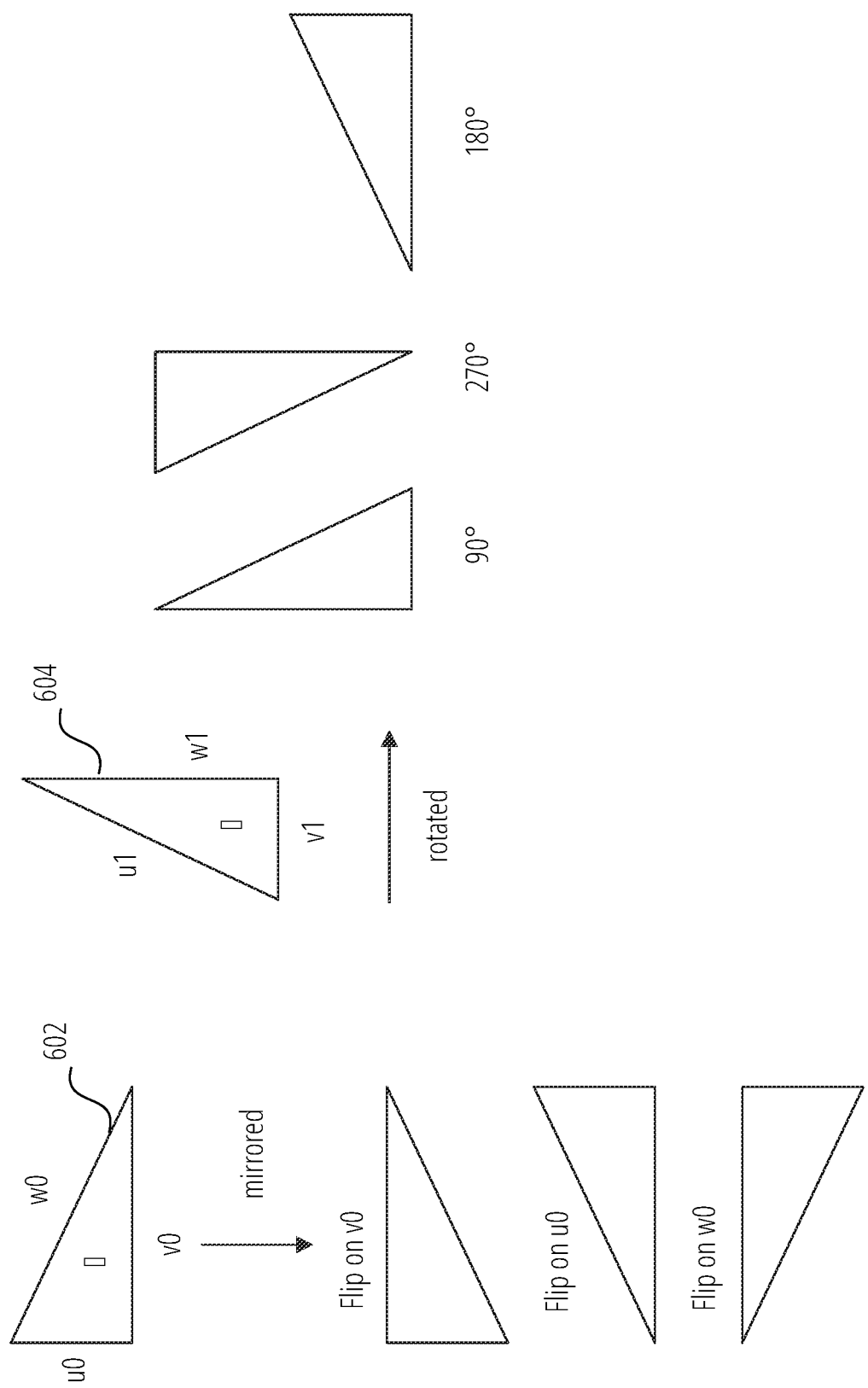
FIG. 6 illustrates an example of object transformation in accordance with one embodiment.

Referencing FIG. 6, for a shape with N vertices, there are N squared possible combinations of mirroring and rotation. If two shapes (shape 602 and shape 604) with N vertices have matching annotations—"A"—then in order to map the edges {u0, v0, w0} in the example shape 0 to the edges {u1, v1, w1} in the example shape 1, the edges of shape 0 must be mirrored N ways and rotated N ways. The sum of the differences in the edge lengths is compared for the N squared possible orientations, and the smallest is chosen as representing a mapping of the edges of one shape to the other.

Once edge matches are made, the length of the matched edges may be set to the average of the measured length of the edges in each shape.

For each edge, the mid-point and two quarter-points are identified. If the mid-point and quarter-points deviate in the same direction from a straight line between the vertices, and the mid-point deviates further than the quarter-points, the edge may be considered a circular arc, passing through the mid-point and the two vertices; otherwise, the edge may be considered a straight line.

Figure 7:
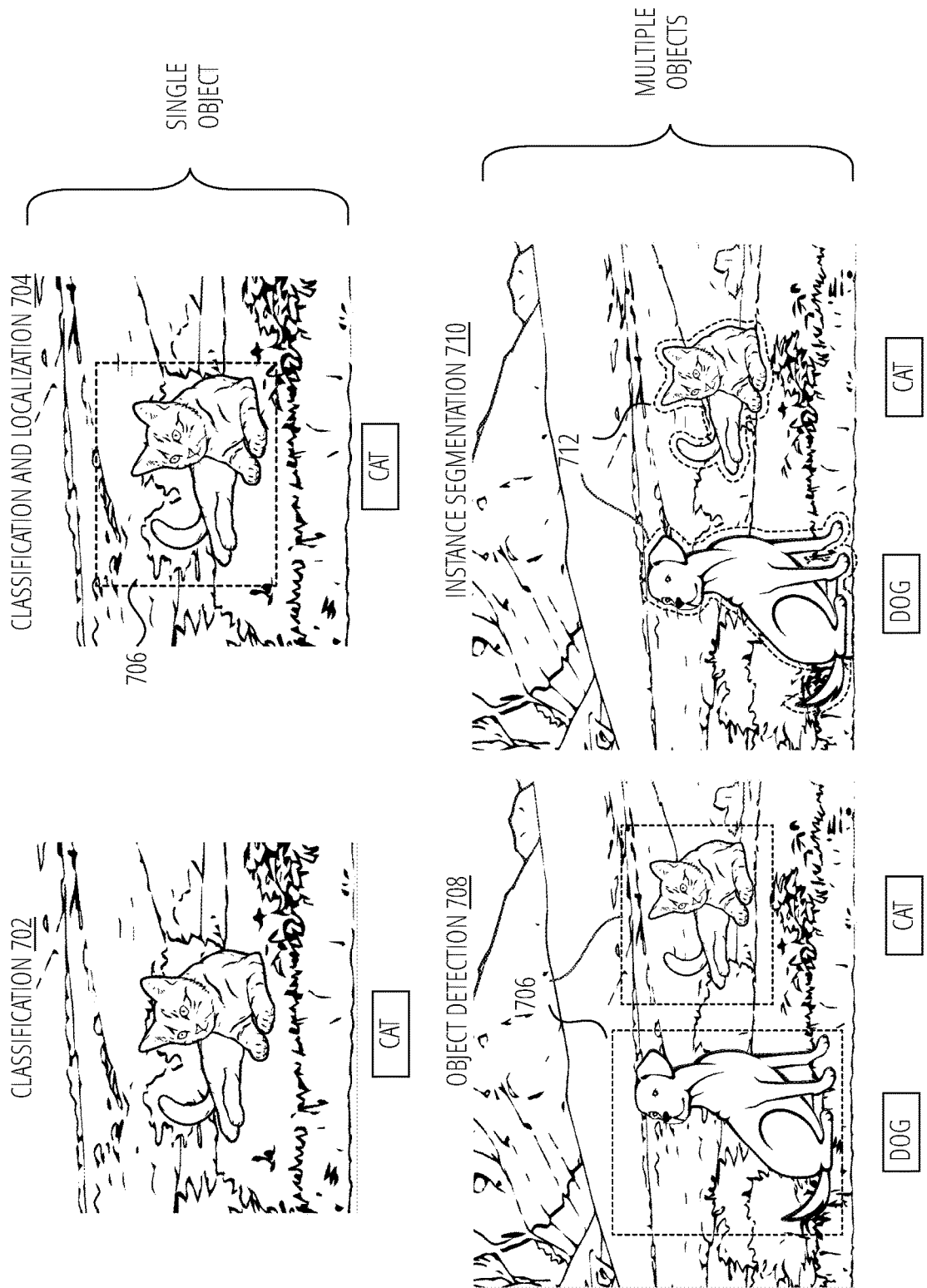
FIG. 7 illustrates a comparison between image classification, object detection, and instance segmentation.

FIG. 7 illustrates a comparison between image classification, object detection, and instance segmentation. When a single object is in an image, the classification model 702 may be utilized to identify what is in the image. For instance, the classification model 702 identifies that a cat is in the image. In addition to the classification model 702, a classification and localization model 704 may be utilized to classify and identify the location of the cat within the image with a bounding box 706. When multiple objects are present within an image, an object detection model 708 may be utilized. The object detection model 708 utilizes bounding boxes to classify and locate the position of the different objects within the image. An instance segmentation model 710 detects each object of an image, its localization and its precise segmentation by pixel with a segmentation region 712.

The Image classification models classify images into a single category, usually corresponding to the most salient object. Photos and videos are usually complex and contain multiple objects. This being said, assigning a label with image classification models may become tricky and uncertain. Object detection models are therefore more appropriate to identify multiple relevant objects in a single image. The second significant advantage of object detection models versus image classification ones is that localization of the objects may be provided.

Some of the model that may be utilized to perform image classification, object detection, and instance segmentation include but are not limited to, Region-based Convolutional Network (R-CNN), Fast Region-based Convolutional Network (Fast R-CNN), Faster Region-based Convolutional Network (Faster R-CNN), Region-based Fully Convolutional Network (R-FCN), You Only Look Once (YOLO), Single-Shot Detector (SSD), Neural Architecture Search Net (NASNet), and Mask Region-based Convolutional Network (Mask R-CNN).

These models may utilize a variety of training datasets that include but are not limited to PASCAL Visual Object Classification (PASCAL VOC) and Common Objects in COntext (COCO) datasets.

The PASCAL Visual Object Classification (PASCAL VOC) dataset is a well-known dataset for object detection, classification, segmentation of objects and so on. There are around 10 000 images for training and validation containing bounding boxes with objects. Although, the PASCAL VOC dataset contains only 20 categories, it is still considered as a reference dataset in the object detection problem.

ImageNet has released an object detection dataset since 2013 with bounding boxes. The training dataset is composed of around 500 000 images only for training and 200 categories.

The Common Objects in COntext (COCO) datasets were developed by Microsoft. This dataset is used for caption generation, object detection, key point detection and object segmentation. The COCO object detection consists in localizing the objects in an image with bounding boxes and categorizing each one of them between 80 categories.

Figure 8:
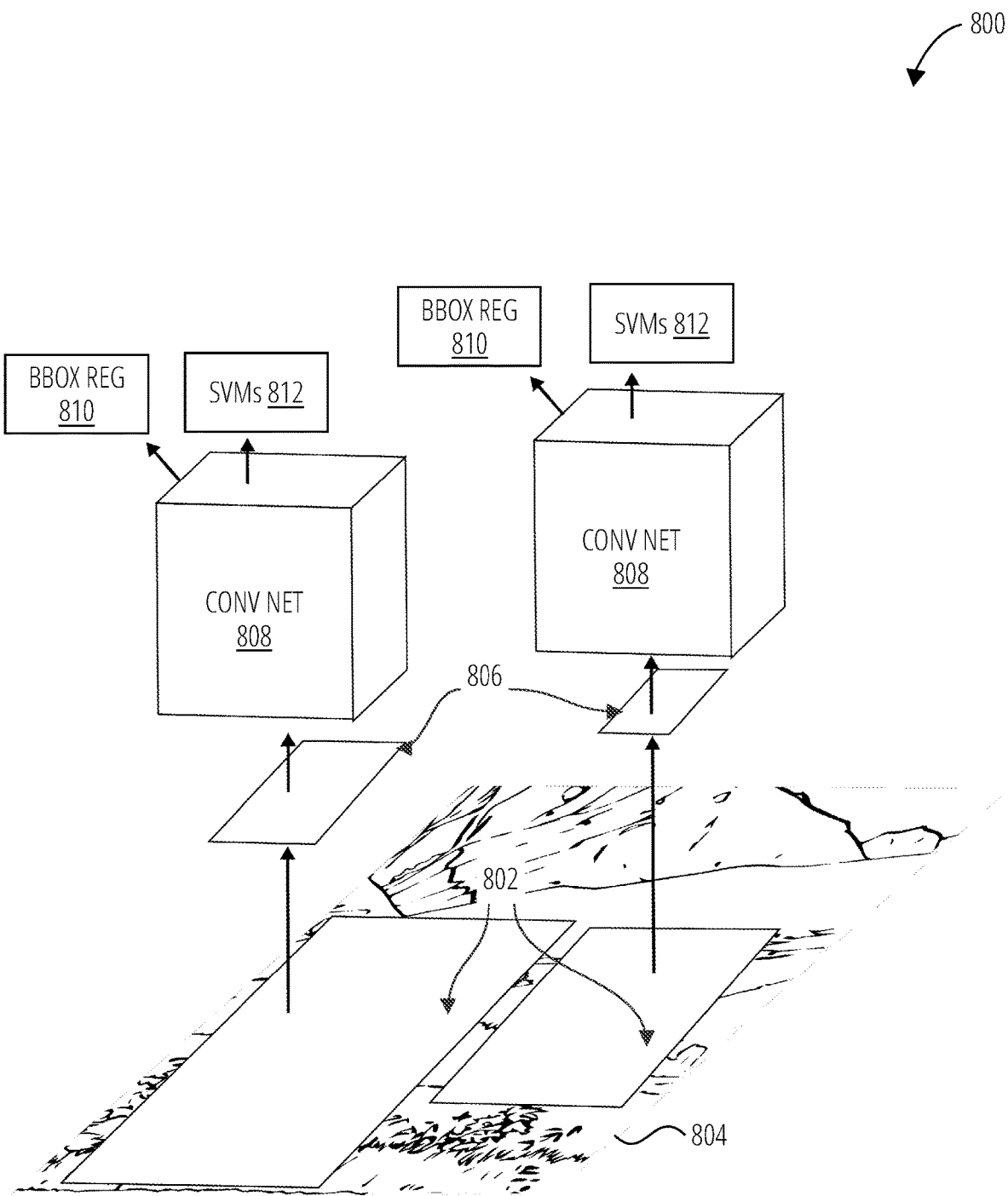
FIG. 8 illustrates a Region-based Convolution Network 800.

FIG. 8 illustrates an example of a Region-based Convolution Network 800 (R-CNN). Each region proposal feeds a convolutional neural network (CNN) to extract a features vector, possible objects are detected using multiple SVM classifiers and a linear regressor modifies the coordinates of the bounding box. The regions of interest (ROI 802) of the input image 804. Each ROI 802 of resized/warped creating the warped image region 806 which are forwarded to the convolutional neural network 808 where they are feed to the support vector machines 812 and bounding box linear regressors 810.

In R-CNN, the selective search method is an alternative to exhaustive search in an image to capture object location. It initializes small regions in an image and merges them with a hierarchical grouping. Thus, the final group is a box containing the entire image. The detected regions are merged according to a variety of color spaces and similarity metrics. The output is a few number of region proposals which could contain an object by merging small regions.

The R-CNN model combines the selective search method to detect region proposals and deep learning to find out the object in these regions. Each region proposal is resized to match the input of a CNN from which the method extracts a 4096-dimension vector of features. The features vector is fed into multiple classifiers to produce probabilities to belong to each class. Each one of these classes has a support vector machines 812 (SVM) classifier trained to infer a probability to detect this object for a given vector of features. This vector also feeds a linear regressor to adapt the shapes of the bounding box for a region proposal and thus reduce localization errors.

The CNN model described is trained on the ImageNet dataset. It is fine-tuned using the region proposals corresponding to an IoU greater than 0.5 with the ground-truth boxes. Two versions are produced, one version is using the PASCAL VOC dataset and the other the ImageNet dataset with bounding boxes. The SVM classifiers are also trained for each class of each dataset.

Figure 9:
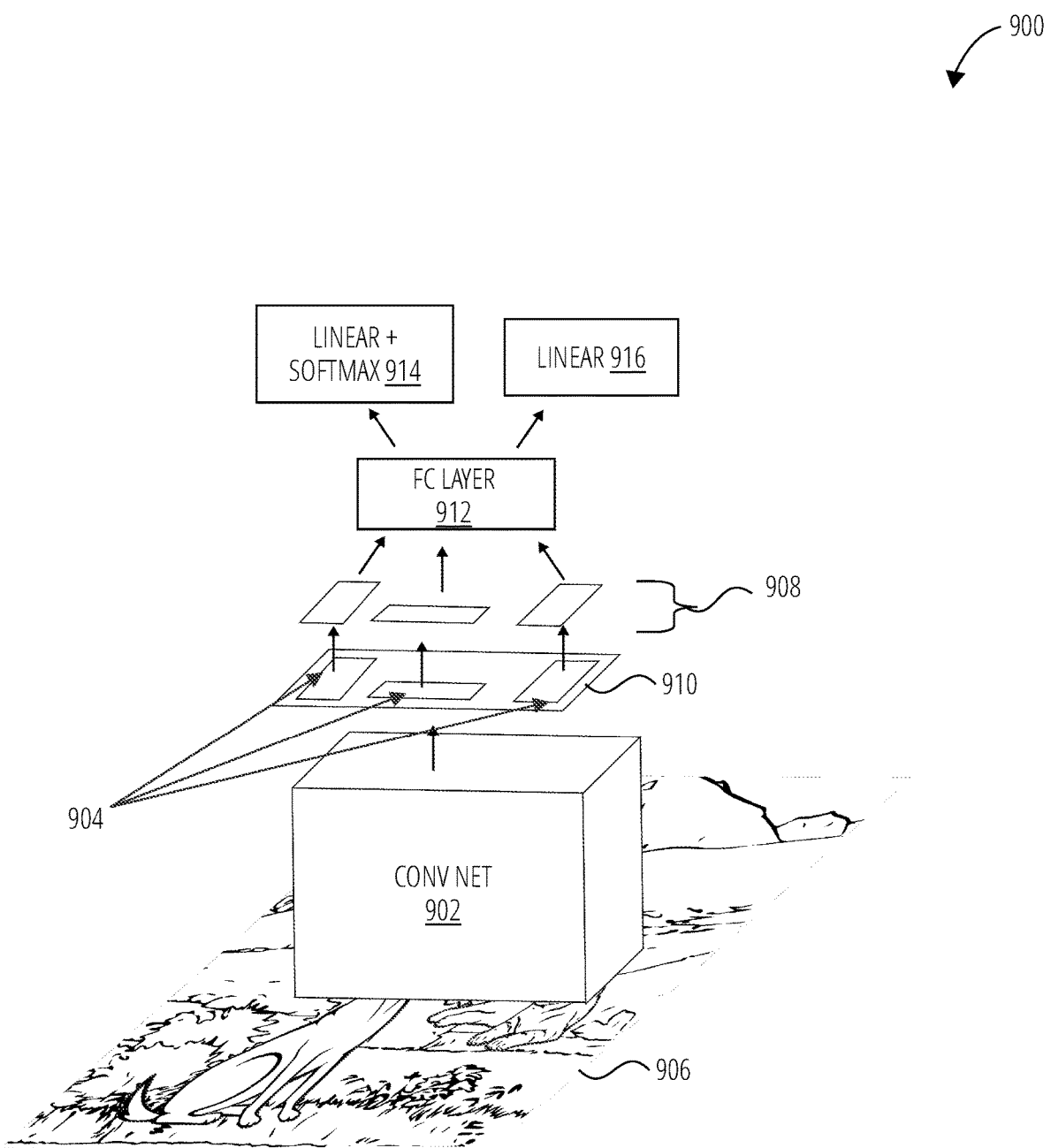
FIG. 9 illustrates a Fast Region-based Convolutional Network 900.

FIG. 9 illustrates an example of a Fast Region-based Convolutional Network 900 (Fast R-CNN). The entire image (input image 906) feeds a CNN model (convolutional neural network 902) to detect RoI (ROI 904) on the feature maps 910. Each region is separated using a RoI pooling layer (ROI pooling layer 908) and it feeds fully connected layers 912. This vector is used by a softmax classifier 914 to detect the object and by a bounding box linear regressors 916 to modify the coordinates of the bounding box. The purpose of the Fast R-CNN is to reduce the time consumption related to the high number of models necessary to analyze all region proposals.

A main CNN with multiple convolutional layers is taking the entire image as input instead of using a CNN for each region proposals (R-CNN). Region of Interests (RoIs) are detected with the selective search method applied on the produced feature maps. Formally, the feature maps size is reduced using a RoI pooling layer to get valid Region of Interests with fixed height and width as hyperparameters. Each RoI layer feeds fully-connected layers creating a features vector. The vector is used to predict the observed object with a softmax classifier and to adapt bounding box localizations with a linear regressor.

Figure 10:
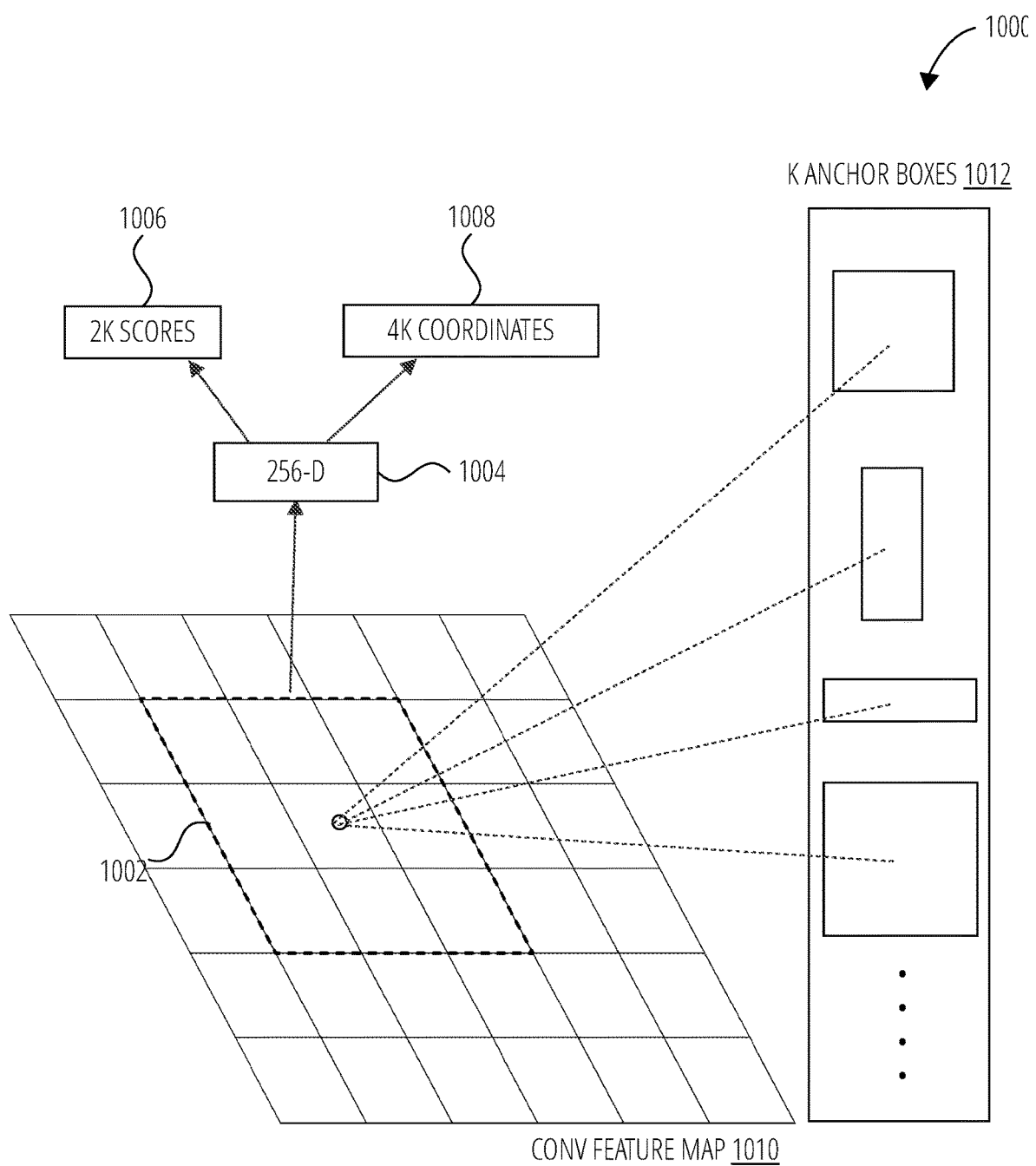
FIG. 10 illustrates a Faster Region-based Convolutional Network 1000.

FIG. 10 illustrates an example of a Faster Region-based Convolutional Network 1000 (Faster R-CNN). Region proposals detected with the selective search method were still necessary in the previous model, which is computationally expensive. Region Proposal Network (RPN) was introduced to directly generate region proposals, predict bounding boxes and detect objects. The Faster R-CNN is a combination between the RPN and the Fast R-CNN model.

A CNN model takes as input the entire image and produces feature map 1010. A window of size 3×3 (sliding window 1002) slides all the feature maps and outputs a features vector (intermediate layer 1004) linked to two fully-connected layers, one for box-regression and one for box-classification. Multiple region proposals are predicted by the fully-connected layers. A maximum of k regions is fixed thus the output of the box regression layer 1008 has a size of 4 k (coordinates of the boxes, their height and width) and the output of the box classification layer 1006 a size of 2 k ("objectness" scores to detect an object or not in the box). The k region proposals detected by the sliding window are called anchors.

When the anchor boxes 1012 are detected, they are selected by applying a threshold over the "objectness" score to keep only the relevant boxes. These anchor boxes and the feature maps computed by the initial CNN model feeds a Fast R-CNN model.

The entire image feeds a CNN model to produce anchor boxes as region proposals with a confidence to contain an object. A Fast R-CNN is used taking as inputs the feature maps and the region proposals. For each box, it produces probabilities to detect each object and correction over the location of the box.

Faster R-CNN uses RPN to avoid the selective search method, it accelerates the training and testing processes, and improve the performances. The RPN uses a pre-trained model over the ImageNet dataset for classification and it is fine-tuned on the PASCAL VOC dataset. Then the generated region proposals with anchor boxes are used to train the Fast R-CNN. This process is iterative.

Other object detection methods are detailed below.

Region-Based Fully Convolutional Network (R-FCN)

Fast and Faster R-CNN methodologies consist in detecting region proposals and recognize an object in each region. The Region-based Fully Convolutional Network (R-FCN) is a model with only convolutional layers allowing complete backpropagation for training and inference. The method merged the two basic steps in a single model to take into account simultaneously the object detection (location invariant) and its position (location variant).

A ResNet-101 model takes the initial image as input. The last layer outputs feature maps, each one is specialized in the detection of a category at some location. For example, one feature map is specialized in the detection of a cat, another one in a banana and so on. Such feature maps are called position-sensitive score maps because they take into account the spatial localization of a particular object. It consists of $k*k*(C+1)$ score maps where k is the size of the score map, and C the number of classes. All these maps form the score bank. Basically, we create patches that can recognize part of an object. For example, for $k=3$, we can recognize 3×3 parts of an object.

In parallel, the method runs a RPN to generate Region of Interest (RoI). Finally, the method cuts each RoI in bins and checks them against the score bank. If enough of these parts are activated, then the patch vote 'yes', I recognized the object.

You Only Look Once (YOLO)

The YOLO model directly predicts bounding boxes and class probabilities with a single network in a single evaluation. The simplicity of the YOLO model allows real-time predictions.

Initially, the model takes an image as input. It divides it into an S×S grid. Each cell of this grid predicts B bounding boxes with a confidence score. This confidence is simply the probability to detect the object multiply by the IoU between the predicted and the ground truth boxes.

The CNN used is inspired by the GoogLeNet model introducing the inception modules. The network has 24 convolutional layers followed by 2 fully-connected layers. Reduction layers with 1×1 filters followed by 3×3 convolutional layers replace the initial inception modules. The Fast YOLO model is a lighter version with only 9 convolutional layers and fewer number of filters. Most of the convolutional layers are pretrained using the ImageNet dataset with classification. Four convolutional layers followed by two fully-connected layers are added to the previous network and it is entirely retrained with the PASCAL VOC datasets.

The final layer outputs a $S*S*(C+B*5)$ tensor corresponding to the predictions for each cell of the grid. C is the number of estimated probabilities for each class. B is the fixed number of anchor boxes per cell, each of these boxes being related to 4 coordinates (coordinates of the center of the box, width and height) and a confidence value.

With the previous models, the predicted bounding boxes often contained an object. The YOLO model however predicts a high number of bounding boxes. Thus, there are a lot of bounding boxes without any object. The Non-Maximum Suppression (NMS) method is applied at the end of the network. It consists in merging highly-overlapping bounding boxes of a same object into a single one.

Single-Shot Detector (SSD)

A Single-Shot Detector (SSD) model predicts all at once the bounding boxes and the class probabilities with an end-to-end CNN architecture.

The model takes an image as the input which passes through multiple convolutional layers with different sizes of filter (10×10, 5×5 and 3×3). Feature maps from convolutional layers at different position of the network are used to predict the bounding boxes. They are processed by specific convolutional layers with 3×3 filters called extra feature layers to produce a set of bounding boxes similar to the anchor boxes of the Fast R-CNN.

Each box has 4 parameters: the coordinates of the center, the width and the height. At the same time, it produces a vector of probabilities corresponding to the confidence over each class of object.

The Non-Maximum Suppression method is also used at the end of the SSD model to keep the most relevant bounding boxes. The Hard Negative Mining (HNM) is then used because a lot of negative boxes are still predicted. It consists in selecting only a subpart of these boxes during the training. The boxes are ordered by confidence and the top is selected depending on the ratio between the negative and the positive which is at most ⅓.

Neural Architecture Search Net (NASNet)

The Neural Architecture Search consists in learning the architecture of a model to optimize the number of layers while improving the accuracy over a given dataset.

The NASNet network has an architecture learned from the CIFAR-10 dataset and is trained with the ImageNet dataset. This model is used for feature maps generation and is stacked into the Faster R-CNN pipeline. Then the entire pipeline is retrained with the COCO dataset.

Mask Region-Based Convolutional Network (Mask R-CNN)

Another extension of the Faster R-CNN model adds a parallel branch to the bounding box detection in order to predict object mask. The mask of an object is its segmentation by pixel in an image. This model outperforms the state-of-the-art in the four COCO challenges: the instance segmentation, the bounding box detection, the object detection and the key point detection.

The Mask Region-based Convolutional Network (Mask R-CNN) uses the Faster R-CNN pipeline with three output branches for each candidate object: a class label, a bounding box offset and the object mask. It uses Region Proposal Network (RPN) to generate bounding box proposals and produces the three outputs at the same time for each Region of Interest (RoI).

The initial RoIPool layer used in the Faster R-CNN is replaced by a RoIAlign layer. It removes the quantization of the coordinates of the original RoI and computes the exact values of the locations. The RoIAlign layer provides scale-equivariance and translation-equivariance with the region proposals.

The model takes an image as input and feeds a ResNeXt network with 101 layers. This model looks like a ResNet but each residual block is cut into lighter transformations which are aggregated to add sparsity in the block. The model detects RoIs which are processed using a RoIAlign layer. One branch of the network is linked to a fully-connected layer to compute the coordinates of the bounding boxes and the probabilities associated to the objects. The other branch is linked to two convolutional layers, the last one computes the mask of the detected object.

Three loss functions associated to each task to solve are summed. This sum is minimized and produces great performances because solving the segmentation task improve the localization and thus the classification.

Fully Convolutional Network (FCN)

J. Long et al. (2015) have been the firsts to develop a Fully Convolutional Network (FCN) (containing only convolutional layers) trained end-to-end for image segmentation.

The FCN takes an image with an arbitrary size and produces a segmented image with the same size. The authors start by modifying well-known architectures (AlexNet, VGG16, GoogLeNet) to have a non-fixed size input while replacing all the fully connected layers by convolutional layers. Since the network produces several feature maps with small sizes and dense representations, an upsampling is necessary to create an output with the same size than the input. Basically, it consists in a convolutional layer with a stride inferior to 1. It is commonly called deconvolution because it creates an output with a larger size than the input. This way, the network is trained using a pixel-wise loss. Moreover, they have added skip connections in the network to combine high level feature map representations with more specific and dense ones at the top of the network.

The authors have reached a 62.2% mIoU score on the 2012 PASCAL VOC segmentation challenge using pre-trained models on the 2012 ImageNet dataset. For the 2012 PASCAL VOC object detection challenge, the benchmark model called Faster R-CNN has reached 78.8% mIoU. Even if we can't directly compare the two results (different models, different datasets and different challenges), it seems that the semantic segmentation task is more difficult to solve than the object detection task.

ParseNet

W. Liu et al. (2015) have published a paper explaining improvements of the FCN model of J. Long et al. (2015). According to the authors, the FCN model loses the global context of the image in its deep layers by specializing the generated feature maps. The ParseNet is an end-to-end convolutional network predicting values for all the pixels at the same time and it avoids taking regions as input to keep the global information. The authors use a module taking feature maps as input. The first step uses a model to generate feature maps which are reduced into a single global feature vector with a pooling layer. This context vector is normalized using the L2 Euclidian Norm and it is unpooled (the output is an expanded version of the input) to produce new feature maps with the same sizes than the initial ones. The second step normalizes the entire initial feature maps using the L2 Euclidian Norm. The last step concatenates the feature maps generated by the two previous steps. The normalization is helpful to scale the concatenated feature maps values and it leads to better performances. Basically, the ParseNet is a FCN with this module replacing convolutional layers. It has obtained a 40.4% mIoU score on the PASCAL-Context challenge and a 69.8% mIoU score on the 2012 PASCAL VOC segmentation challenge.

Convolutional and Deconvolutional Networks

H. Noh et al. (2015) have released an end-to-end model composed of two linked parts. The first part is a convolutional network with a VGG16 architecture. It takes as input an instance proposal, for example a bounding box generated by an object detection model. The proposal is processed and transformed by a convolutional network to generate a vector of features. The second part is a deconvolutional network taking the vector of features as input and generating a map of pixel-wise probabilities belonging to each class. The deconvolutional network uses unpooling targeting the maximum activations to keep the location of the information in the maps. The second network also uses deconvolution associating a single input to multiple feature maps. The deconvolution expands feature maps while keeping the information dense.

The authors have analyzed deconvolution feature maps and they have noted that the low-level ones are specific to the shape while the higher-level ones help to classify the proposal. Finally, when all the proposals of an image are processed by the entire network, the maps are concatenated to obtain the fully segmented image. This network has obtained a 72.5% mIoU on the 2012 PASCAL VOC segmentation challenge.

U-Net

O. Ronneberger et al. (2015) have extended the FCN of J. Long et al. (2015) for biological microscopy images. The authors have created a network called U-net composed in two parts: a contracting part to compute features and a expanding part to spatially localize patterns in the image. The downsampling or contracting part has a FCN-like architecture extracting features with 3×3 convolutions. The upsampling or expanding part uses up-convolution (or deconvolution) reducing the number of feature maps while increasing their height and width. Cropped feature maps from the downsampling part of the network are copied within the upsampling part to avoid losing pattern information. Finally, a 1×1 convolution processes the feature maps to generate a segmentation map and thus categorize each pixel of the input image. Since then, the U-net architecture has been widely extended in recent works (FPN, PSPNet, DeepLabv3 and so on). Note that it doesn't use any fully-connected layer. As a consequence, the number of parameters of the model is reduced and it can be trained with a small labelled dataset (using appropriate data augmentation). For example, the authors have used a public dataset with 30 images for training during their experiments.

Feature Pyramid Network (FPN)

The Feature Pyramid Network (FPN) has been developed by T.-Y. Lin et al (2016) and it is used in object detection or image segmentation frameworks. Its architecture is composed of a bottom-up pathway, a top-down pathway and lateral connections in order to join low-resolution and high-resolution features. The bottom-up pathway takes an image with an arbitrary size as input. It is processed with convolutional layers and downsampled by pooling layers. Note that each bunch of feature maps with the same size is called a stage, the outputs of the last layer of each stage are the features used for the pyramid level. The top-down pathway consists in upsampling the last feature maps with unpooling while enhancing them with feature maps from the same stage of the bottom-up pathway using lateral connections. These connections consist in merging the feature maps of the bottom-up pathway processed with a 1×1 convolution (to reduce their dimensions) with the feature maps of the top-down pathway.

The concatenated feature maps are then processed by a 3×3 convolution to produce the output of the stage. Finally, each stage of the top-down pathway generates a prediction to detect an object. For image segmentation, the authors uses two Multi-Layer Perceptrons (MLP) to generate two masks with different size over the objects. It works similarly to Region Proposal Networks with anchor boxes (R-CNN R. Girshick et al. (2014), Fast R-CNN R. Girshick et al. (2015), Faster R-CNN S. Ren et al. (2016) and so on). This method is efficient because it better propagates low information into the network. The FPN based on DeepMask (P. O. Pinheiro et al. (2015)) and SharpMask (P. O. Pinheiro et al. (2016)) frameworks achieved a 48.1% Average Recall (AR) score on the 2016 COCO segmentation challenge.

Pyramid Scene Parsing Network (PSPNet)

H. Zhao et al. (2016) have developed the Pyramid Scene Parsing Network (PSPNet) to better learn the global context representation of a scene. Patterns are extracted from the input image using a feature extractor (ResNet K. He et al. (2015)) with a dilated network strategy[1]. The feature maps feed a Pyramid Pooling Module to distinguish patterns with different scales. They are pooled with four different scales each one corresponding to a pyramid level and processed by a 1×1 convolutional layer to reduce their dimensions. This way each pyramid level analyses sub-regions of the image with different location. The outputs of the pyramid levels are upsampled and concatenated to the initial feature maps to finally contain the local and the global context information. Then, they are processed by a convolutional layer to generate the pixel-wise predictions. The best PSPNet with a pretrained ResNet (using the COCO dataset) has reached a 85.4% mIoU score on the 2012 PASCAL VOC segmentation challenge.

Mask R-CNN

K. He et al. (2017) have released the Mask R-CNN model beating all previous benchmarks on many COCO challenges[2]. The RPN extracts Region of Interest (RoI) and a RoIPool layer computes features from these proposals in order to infer the bounding box coordinates and the class of the object. The Mask R-CNN is a Faster R-CNN with 3 output branches: the first one computes the bounding box coordinates, the second one computes the associated class and the last one computes the binary mask[3] to segment the object. The binary mask has a fixed size and it is generated by a FCN for a given RoI. It also uses a RoIAlign layer instead of a RoIPool to avoid misalignments due to the quantization of the RoI coordinates. The particularity of the Mask R-CNN model is its multi-task loss combining the losses of the bounding box coordinates, the predicted class and the segmentation mask. The model tries to solve complementary tasks leading to better performances on each individual task. The best Mask R-CNN uses a ResNeXt (S. Xie et al. (2016)) to extract features and a FPN architecture. It has obtained a 37.1% AP score on the 2016 COCO segmentation challenge and a 41.8% AP score on the 2017 COCO segmentation challenge.

DeepLab

Inspired by the FPN model of T.-Y. Lin et al (2016), L.-C. Chen et al. (2017) have released DeepLab combining atrous convolution, spatial pyramid pooling and fully connected CRFs. The model presented in this paper is also called the DeepLabv2 because it is an adjustment of the initial DeepLab model (details about the initial one will not be provided to avoid redundancy). According to the authors, consecutive max-pooling and striding reduces the resolution of the feature maps in deep neural networks. They have introduced the atrous convolution which is basically the dilated convolution of H. Zhao et al. (2016). It consists of filters targeting sparse pixels with a fixed rate. For example, if the rate is equal to 2, the filter targets one pixel over two in the input; if the rate equal to 1, the atrous convolution is a basic convolution. Atrous convolution permits to capture multiple scale of objects. When it is used without max-pooling, it increases the resolution of the final output without increasing the number of weights.

The Atrous Spatial Pyramid Pooling consists in applying several atrous convolution of the same input with different rate to detect spatial patterns. The features maps are processed in separate branches and concatenated using bilinear interpolation to reconvert the original size of the input. The output feeds a fully connected Conditional Random Field (CRF) (Krähenbühl and V. Koltun (2012)) computing edges between the features and long term dependencies to produce the semantic segmentation.

The best DeepLab using a ResNet-101 as backbone has reached a 79.7% mIoU score on the 2012 PASCAL VOC challenge, a 45.7% mIoU score on the PASCAL-Context challenge and a 70.4% mIoU score on the Cityscapes challenge.

DeepLabv3

L.-C. Chen et al. (2017) have revisited the DeepLab framework to create DeepLabv3 combining cascaded and parallel modules of atrous convolutions. The authors have modified the ResNet architecture to keep high resolution feature maps in deep blocks using atrous convolutions.

The parallel atrous convolution modules are grouped in the Atrous Spatial Pyramid Pooling (ASPP). A 1×1 convolution and batch normalization are added in the ASPP. All the outputs are concatenated and processed by another 1×1 convolution to create the final output with logits for each pixel.

The best DeepLabv3 model with a ResNet-101 pretrained on ImageNet and JFT-300M datasets has reached 86.9% mIoU score in the 2012 PASCAL VOC challenge. It also achieved a 81.3% mIoU score on the Cityscapes challenge with a model only trained with the associated training dataset.

DeepLabv3+

L.-C. Chen et al. (2018) have finally released the Deeplabv3+ framework using an encoder-decoder structure. The authors have introduced the atrous separable convolution composed of a depth wise convolution (spatial convolution for each channel of the input) and pointwise convolution (1×1 convolution with the depth wise convolution as input).

They have used the DeepLabv3 framework as an encoder. The most performant model has a modified Xception (F. Chollet (2017)) backbone with more layers, atrous depth wise separable convolutions instead of max pooling and batch normalization. The outputs of the ASPP are processed by a 1×1 convolution and upsampled by a factor of 4. The outputs of the encoder backbone CNN are also processed by another 1×1 convolution and concatenated to the previous ones. The feature maps feed two 3×3 convolutional layers and the outputs are upsampled by a factor of 4 to create the final segmented image.

The best DeepLabv3+ pretrained on the COCO and the JFT datasets has obtained a 89.0% mIoU score on the 2012 PASCAL VOC challenge. The model trained on the Cityscapes dataset has reached a 82.1% mIoU score for the associated challenge.

Path Aggregation Network (PANet)

S. Liu et al. (2018) have recently released the Path Aggregation Network (PANet). This network is based on the Mask R-CNN and the FPN frameworks while enhancing information propagation. The feature extractor of the network uses a FPN architecture with a new augmented bottom-up pathway improving the propagation of low-layer features. Each stage of this third pathway takes as input the feature maps of the previous stage and processes them with a 3×3 convolutional layer. The output is added to the same stage feature maps of the top-down pathway using lateral connection and these feature maps feed the next stage.

The feature maps of the augmented bottom-up pathway are pooled with a RoIAlign layer to extract proposals from all level features. An adaptive feature pooling layer processes the features maps of each stage with a fully connected layer and concatenate all the outputs.

The output of the adaptive feature pooling layer feeds three branches similarly to the Mask R-CNN. The two first branches uses a fully connected layer to generate the predictions of the bounding box coordinates and the associated object class. The third branch process the RoI with a FCN to predict a binary pixel-wise mask for the detected object. The authors have added a path processing the output of a convolutional layer of the FCN with a fully connected layer to improve the localization of the predicted pixels. Finally, the output of the parallel path is reshaped and concatenated to the output of the FCN generating the binary mask.

The PANet has achieved 42.0% AP score on the 2016 COCO segmentation challenge using a ResNeXt as feature extractor. They also performed the 2017 COCO segmentation challenge with an 46.7% AP score using a ensemble of seven feature extractors: ResNet (K. He et al. (2015), ResNeXt (S. Xie et al. (2016)) and SENet (J. Hu et al. (2017)).

Context Encoding Network (EncNet)

H. Zhang et al. (2018) have created a Context Encoding Network (EncNet) capturing global information in an image to improve scene segmentation. The model starts by using a basic feature extractor (ResNet) and feeds the feature maps into a Context Encoding Module inspired from the Encoding Layer of H. Zhang et al. (2016). Basically, it learns visual centers and smoothing factors to create an embedding taking into account the contextual information while highlighting class-dependent feature maps. On top of the module, scaling factors for the contextual information are learnt with a feature maps attention layer (fully connected layer). In parallel, a Semantic Encoding Loss (SE-Loss) corresponding to a binary cross-entropy loss regularizes the training of the module by detecting presence of object classes (unlike the pixel-wise loss). The outputs of the Context Encoding Module are reshaped and processed by a dilated convolution strategy while minimizing two SE-losses and a final pixel-wise loss. The best EncNet has reached 52.6% mIoU and 81.2% pirac scores on the PASCAL-Context challenge. It has also achieved a 85.9% mIoU score on the 2012 PASCAL VOC segmentation challenge.

Figure 11:
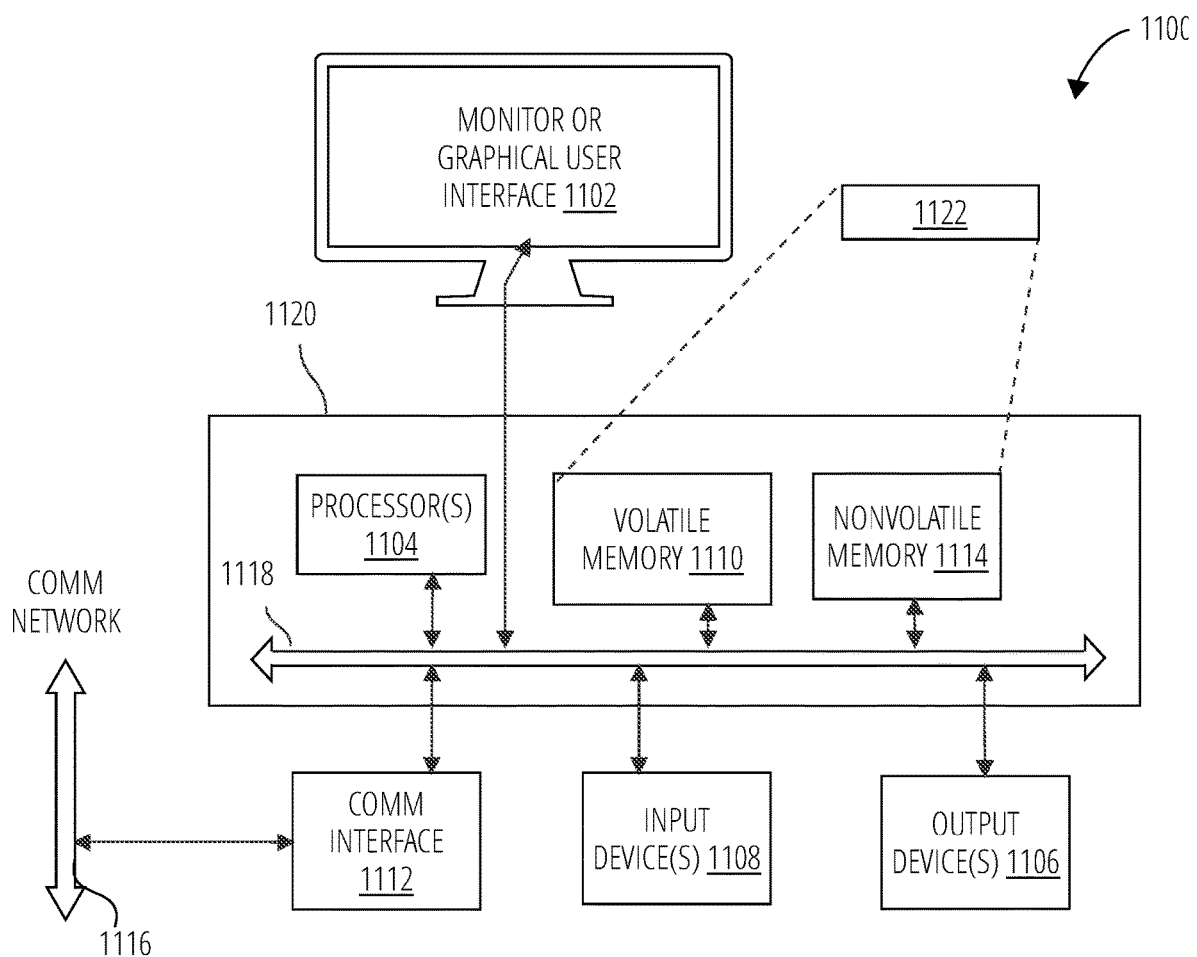
FIG. 11 is an example block diagram of a computing device 1100 that may incorporate embodiments of the present disclosure.

FIG. 11 is an example block diagram of a computing device 1100 that may incorporate embodiments of the present invention. FIG. 11 is merely illustrative of a machine system to carry out aspects of the technical processes described herein and does not limit the scope of the claims. One of ordinary skill in the art would recognize other variations, modifications, and alternatives. In one embodiment, the computing device 1100 typically includes a monitor or graphical user interface 1102, a data processing system 1120, a communication network interface 1112, input device(s) 1108, output device(s) 1106, and the like.

As depicted in FIG. 11, the data processing system 1120 may include one or more processor(s) 1104 that communicate with a number of peripheral devices via a bus subsystem 1118. These peripheral devices may include input device(s) 1108, output device(s) 1106, communication network interface 1112, and a storage subsystem, such as a volatile memory 1110 and a nonvolatile memory 1114.

The volatile memory 1110 and/or the nonvolatile memory 1114 may store computer-executable instructions and thus forming logic 1122 that when applied to and executed by the processor(s) 1104 implement embodiments of the processes disclosed herein.

The input device(s) 1108 include devices and mechanisms for inputting information to the data processing system 1120. These may include a keyboard, a keypad, a touch screen incorporated into the monitor or graphical user interface 1102, audio input devices such as voice recognition systems, microphones, and other types of input devices. In various embodiments, the input device(s) 1108 may be embodied as a computer mouse, a trackball, a track pad, a joystick, wireless remote, drawing tablet, voice command system, eye tracking system, and the like. The input device(s) 1108 typically allow a user to select objects, icons, control areas, text and the like that appear on the monitor or graphical user interface 1102 via a command such as a click of a button or the like.

The output device(s) 1106 include devices and mechanisms for outputting information from the data processing system 1120. These may include the monitor or graphical user interface 1102, speakers, printers, infrared LEDs, and so on as well understood in the art.

The communication network interface 1112 provides an interface to communication networks (e.g., communication network 1116) and devices external to the data processing system 1120. The communication network interface 1112 may serve as an interface for receiving data from and transmitting data to other systems. Embodiments of the communication network interface 1112 may include an Ethernet interface, a modem (telephone, satellite, cable, ISDN), (asynchronous) digital subscriber line (DSL), Fire-Wire, USB, a wireless communication interface such as Bluetooth or WiFi, a near field communication wireless interface, a cellular interface, and the like.

The communication network interface 1112 may be coupled to the communication network 1116 via an antenna, a cable, or the like. In some embodiments, the communication network interface 1112 may be physically integrated on a circuit board of the data processing system 1120, or in some cases may be implemented in software or firmware, such as "soft modems", or the like.

The computing device 1100 may include logic that enables communications over a network using protocols such as HTTP, TCP/IP, RTP/RTSP, IPX, UDP and the like.

The volatile memory 1110 and the nonvolatile memory 1114 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1110 and the nonvolatile memory 1114 may be configured to store the basic programming and data constructs that provide the functionality of the disclosed processes and other embodiments thereof that fall within the scope of the present invention.

Logic 1122 that implements embodiments of the present invention may be stored in the volatile memory 1110 and/or the nonvolatile memory 1114. Said logic 1122 may be read from the volatile memory 1110 and/or nonvolatile memory 1114 and executed by the processor(s) 1104. The volatile memory 1110 and the nonvolatile memory 1114 may also provide a repository for storing data used by the logic 1122.

The volatile memory 1110 and the nonvolatile memory 1114 may include a number of memories including a main random access memory (RAM) for storage of instructions and data during program execution and a read only memory (ROM) in which read-only non-transitory instructions are stored. The volatile memory 1110 and the nonvolatile memory 1114 may include a file storage subsystem providing persistent (non-volatile) storage for program and data files. The volatile memory 1110 and the nonvolatile memory 1114 may include removable storage systems, such as removable flash memory.

The bus subsystem 1118 provides a mechanism for enabling the various components and subsystems of data processing system 1120 communicate with each other as intended. Although the communication network interface 1112 is depicted schematically as a single bus, some embodiments of the bus subsystem 1118 may utilize multiple distinct busses.

It will be readily apparent to one of ordinary skill in the art that the computing device 1100 may be a device such as a smartphone, a desktop computer, a laptop computer, a rack-mounted computer system, a computer server, or a tablet computer device. As commonly known in the art, the computing device 1100 may be implemented as a collection of multiple networked computing devices. Further, the computing device 1100 will typically include operating system logic (not illustrated) the types and nature of which are well known in the art.

The methods and system in this disclosure are described in the preceding on the basis of several preferred embodiments. Different aspects of different variants are considered to be described in combination with each other such that all combinations, upon reading by a skilled person in the field on the basis of this document, may be regarded as being read within the concept of the disclosure. The preferred embodiments do not limit the extent of protection of this document.

Having thus described embodiments of the present disclosure of the present application in detail and by reference to illustrative embodiments thereof, it will be apparent that modifications and variations are possible without departing from the scope of the present disclosure.

What is claimed is:

1. A system comprising:
    a scanner to convert a packaging sketch into a pixelated image;
    a convolutional neural network configured to segment the pixelated image into bounded objects including fold lines and cut lines; and
    a controller configured to transform the fold lines and the cut lines into control commands to a folding machine and a cutting machine.

2. The system of claim 1, wherein the convolutional neural network is further configured to generate package design instructions based on the pixelated image that has been segmented.

3. The system of claim 2, further comprising an operator machine interface, wherein before the controller receives the package design instructions, the package design instructions are rendered as a displayable package design drawing and displayed on the operator machine interface.

4. The system of claim 3, further comprising logic to:
    on condition the displayable package design drawing does not require changes, send the package design instructions to the controller; and
    on condition the displayable package design drawing requires changes, convert an altered package design drawing into an updated pixelated image using the scanner.

5. The system of claim 1, further comprising:
    logic to apply annotations associated with the bounded objects to transform non-similar bounded objects into similar bounded objects.

6. The system of claim 5, further comprising:
    logic to alter the fold lines and the cut lines to transform the non-similar bounded objects into the similar bounded objects.

7. The system of claim 1, wherein the fold lines are depicted by solid lines between the bounded objects on the packaging sketch.

8. The system of claim 1, wherein at least some of the cut lines are perforation lines depicted by irregular lines on the packaging sketch.

9. The system of claim 1, wherein the cut lines are computed from a machine-derived rectangular bounding box for the packaging sketch.

10. The system of claim 1, further comprising a feedback path from a printer to the scanner.

11. A method comprising:
    converting a packaging sketch into a pixelated image using a scanner;
    segmenting, using a convolutional neural network, the pixelated image into bounded objects including fold lines and cut lines; and
    transforming, using a controller, the fold lines and the cut lines into control commands to a folding machine and a cutting machine.

12. The method of claim 11, further comprising generating package design instructions based on the pixelated image that has been segmented.

13. The method of claim 12, further comprising, before the transforming step, rendering the package design instructions as a displayable package design drawing and displaying the displayable package design drawing on an operator machine interface.

14. The method of claim 13, further comprising:
    on condition the displayable package design drawing does not require changes, initiating the transforming step; and
    on condition the displayable package design drawing requires changes, altering the displayable package design drawing and reinitiating at least one of the converting, segmenting, and generating steps with the altered drawing.

15. The method of claim 11, further comprising using logic to apply annotations associated with the bounded objects to transform non-similar bounded objects into similar bounded objects.

16. The method of claim 15, further comprising using logic to alter the fold lines and the cut lines to transform the non-similar bounded objects into the similar bounded objects.

17. The method of claim 11, wherein the fold lines are depicted by solid lines between the bounded objects on the packaging sketch.

18. The method of claim 11, wherein at least some of the cut lines are perforation lines depicted by irregular lines on the packaging sketch.

19. The method of claim 11, wherein the cut lines are computed from a machine-derived rectangular bounding box for the packaging sketch.

20. The method of claim 11, further comprising providing feedback through a feedback path from a printer to the scanner.

* * * * *